United States Patent [19]

Gunti

[11] 4,200,178
[45] Apr. 29, 1980

[54] TRANSFER CONVEYOR FOR PIECE GOODS CONVEYORS

[75] Inventor: Rolf Gunti, Laufen, Switzerland

[73] Assignee: Masyc A.G., Munchenstein, Switzerland

[21] Appl. No.: 897,707

[22] Filed: Apr. 19, 1978

[30] Foreign Application Priority Data

Apr. 19, 1977 [CH] Switzerland ............... 4841/77

[51] Int. Cl.² ............... B65G 37/00; B65G 47/34
[52] U.S. Cl. ............... 198/372; 198/597; 198/367
[58] Field of Search ............ 198/372, 597, 367, 440, 198/809

[56] References Cited

U.S. PATENT DOCUMENTS

| 1,939,891 | 12/1933 | Glahn et al. | 198/372 |
| 3,104,004 | 9/1963 | Poel et al. | 198/471 |

Primary Examiner—Joseph L. Valenza
Assistant Examiner—Brian Bond
Attorney, Agent, or Firm—Anthony J. Casella

[57] ABSTRACT

A transfer conveyor for transferring goods from one conveyor to another comprises two pairs of similar conveyor chains each chain being guided around a closed path, including a top run extending from one conveyor to the other, by guide means including reversing pulleys at the opposite ends of the top run. The top runs of all of the chains are preferably of the same length, parallel and substantially co-planar with the other top runs, lying just below the conveying planes of the two conveyors between which transfer is to be made. The chains are driven in synchronism and a set of lifting elements includes a pair of lifting elements secured to each chain so that during circulation of the chains, all of the lifting elements of the set rise above or fall below the conveying plane at the same time by passing around the respective reversing pulleys at the same time, to lift an article on one conveyor, transfer it laterally to above the other conveyor and lower it on to the same.

7 Claims, 4 Drawing Figures

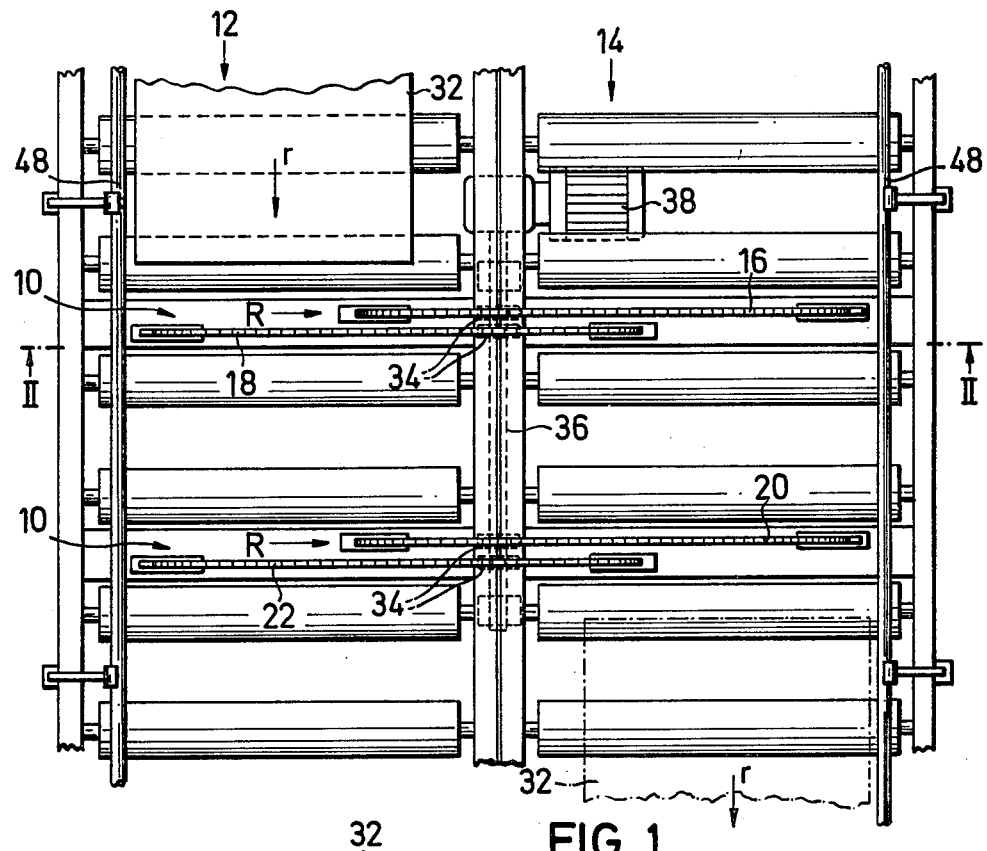
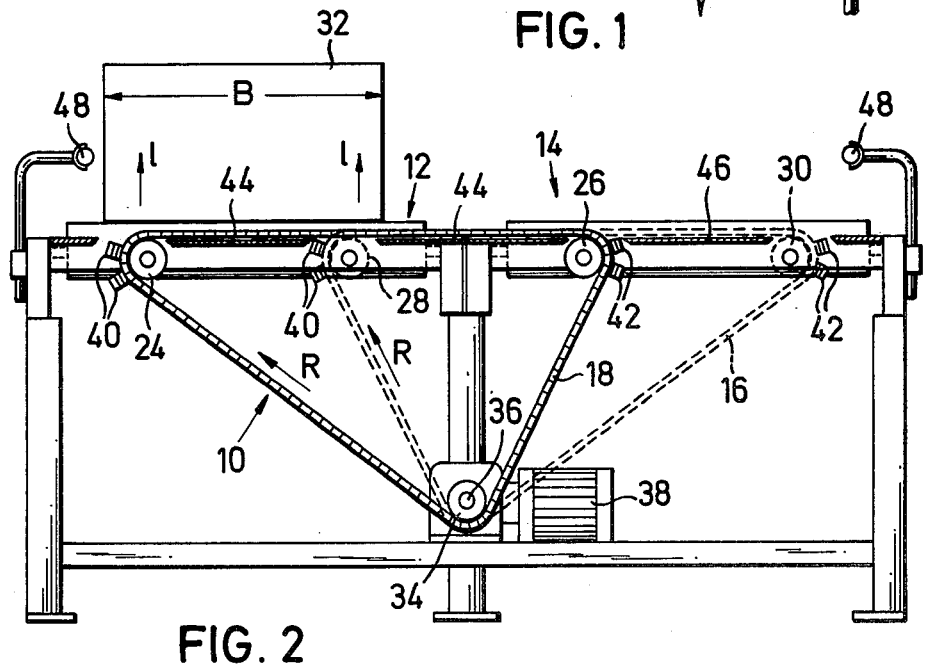

TRANSFER CONVEYOR FOR PIECE GOODS CONVEYORS

FIELD OF THE INVENTION

The invention relates to a transfer conveyor for the optional transfer of piece goods from the conveyor track of a first piece goods conveyor to the conveyor track of a second piece goods conveyor by means of a transfer conveyor.

BACKGROUND OF THE INVENTION

Transfer conveyors have already been proposed which include conveyor chains which circulate endlessly about reversing pulleys transversely to the conveying direction of at least the first piece goods conveyor and beneath the conveying plane thereof and which chains are provided with lifting elements which are situated beneath the conveying plane of said first piece goods conveyor in a pass-through position and in a transfer position project simultaneously above said conveying plane at a predefined distance from each other which is less than the width of the piece goods.

German Offenlegungsschrift 2,259,273 discloses a system of this kind in which the conveyor chains with lifting elements are guided in the region of the conveyor plane over guide rails on which cam tracks are formed on which the lifting elements are guided upwardly by means of a rising ramp and from which the lifting elements are guided downwardly by means of a falling ramp. Lifting elements situated on opposite sides of a conveyor chain are disposed at a defined distance from each other which is shorter than the width of the piece goods which are to be transferred. Each lifting element is associated with its own cam track and the rising and falling ramps of two adjacent cam tracks must be offset relative to each other at the same defined distance. The known device suffers from the disadvantage of calling for guide rails which have to be constructed with cam tracks as well as rising and falling ramps. Moreover, resilient chain tensioning means must be provided for each conveyor chain because the circumference of the chain is deformed in the course of its movement when the lifting elements move via the rising ramps on to the cam tracks and again slide off the cam tracks via the falling ramps.

The prior art also discloses a system (U.S. Pat. No. 3,104,004) in which a circulating chain is provided which is inclined at an angle to the horizontal and in which drivers are secured on one chain member, one behind the other, the vertical extent of which said drivers increases from the front to the rear in the direction of movement so that all drivers project simultaneously above the plane of the piece goods conveyor to lift one item of piece goods.

The construction and installation of these known systems is very complex owing to the drivers of varying size required for such a system. Moreover, the known system is unsuitable for transferring two conveyors which are disposed parallel with each other because the transfer system itself can deposit an item of piece goods on to a second piece goods conveyor extending transversely to the transfer direction only by the use of great force, once such an item of piece goods has been lifted, because in this case the group of drivers must first be withdrawn from beneath the item of piece goods which is retained by a stop abutment while the item of piece goods itself is raised.

The prior art discloses a system (German Offenlegungsschrift 2,515,024) in which the lifting elements are hinged to the conveyor chains in the form of pivoting levers.

SUMMARY OF THE INVENTION

It is an object of the present invention to provide a transfer conveyor of the kind described hereinbefore which incorporates simpler elements which can be produced with less complexity and can be more readily installed and dismantled than in the case of known systems of this kind.

It is another object of the invention to provide a transfer conveyor of the kind described which can ensure trouble-free changeover of the transfer conveyor between positions ensuring transfer and positions allowing pass-through of piece goods items which follow each other, on the piece goods conveyor from which the goods may be transferred optionally by the transfer conveyor, more particularly in the case of parallel piece goods conveyors and with a low energy consumption during the transfer motion itself but with a higher degree of reliability.

According to one aspect of the invention there is provided a transfer conveyor suitable for the optional transfer of piece goods from a first roller track conveyor to a second, adjoining parallel and co-planar roller track conveyor, said transfer conveyor comprising at least three endless flexible filamentary conveyor elements, guiding means for guiding said conveying elements around respective paths, each said path including an upper conveying run and a lower, return run, said upper runs being straight, being disposed below but closely adjacent predetermined plane and being of the same length, the transfer conveyor including, associated with said conveying element, respective reversing means over which the conveying element passes at opposite ends of its conveying run, said conveying run extending substantially parallel with each other and the transfer conveyor including lifting elements secured to said conveying elements, each said conveying element having at least one said lifting element secured thereto, each said liftingelement when disposed on the return run of the associated conveyor element being situated entirely below said conveying plane and when disposed on the conveying run of the associated conveyor element projecting above said conveying plane, the transfer conveyor further including driving means in positive engagement with said conveying elements whereby said conveying elements can be driven at the same linear speed, the positions of said conveying runs relative to each other and the positions of said lifting elements on said conveying elements, and the engagement of said driving means with said conveying elements being such that during driving of said elements by said driving means, on each of said conveying runs, a respective lifting element rises above the conveying plane simultaneously the respective positions of the lifting elements so rising being distributed in two dimensions in the conveying plane.

According to another aspect of the invention there is provided a transfer conveyor suitable for the optional transfer of piece goods from a first roller track conveyor to a second, adjoining, parallel and co-planar roller track conveyor said transfer conveyor comprising a first and a second pair of endless conveyor chains, guiding means for guiding each said conveyor chain including, for each said chain, a first and a second reversing pulley, means mounting said reversing pulleys rotatably at positions below a predetermined conveying plane, each said conveyor chain having an upper, conveying run extending between the tops of the respective first and second reversing pulleys below, but adjacent said conveying plane and a lower, return, run extending below the respective conveying run, each said chain having a lifting element thereon which, when disposed on the respective return run lies below said conveying plane and which, when disposed on the respective conveying run lies above the conveying plane, said chains having their conveying runs parallel with each other and said chains being spaced apart transversely of the longitudinal direction of their conveying runs, said reversing pulleys associated with one conveyor chain of one pair being spaced from the reversing pulleys of the other conveyor chain of the same pair and the lifting elements being disposed at the same circumferential place of both conveyor chains of one pair, the transfer conveyor including driving means in driving engagement with each chain whereby the transfer conveyor can be placed in a pass-through position in which all of said lifting elements are situated below said conveyor plane and a transfer position in which said lifting elements project simultaneously above said conveying plane.

Advantageously, the transfer conveyor is arranged so that each of the conveyor chains supports at least two closely adjacently disposed lifting elements at the same circumferential place, while furthermore the transfer conveyor is advantageously arranged so that each conveyor chain supports at least one second group of lifting elements situated at a distance from the first group of lifting elements which said distance is greater than the distance between the distal circumferential parts of the reversing pulleys disposed in the region of the conveying plane and associated with the same conveyor chain.

One advantageous further embodiment of the invention is arranged so that the driving pinions of the conveyor chains of at least one pair are disposed on the same driving axis, while it is preferred that the conveyor chains are guided on guide rails which are disposed parallel with the conveyor plane.

It is an important advantage of the invention that special cam tracks with rising and falling ramps as well as resilient chain tensioning devices which must be provided in prior transfer conveyors can be omitted in a transfer conveyor according to the invention while it is nevertheless possible to employ a conveyor chain of conventional construction.

It is another advantage of the invention that the lifting elements can be of very simple construction and need only be joined in non-rotational manner to the conveyor chains.

It is of course possible to replace the conveyor chains with, for example conveyor belts, such as toothed belts, in which case the lifting elements, also in the form of cams, can be rigidly joined to the belts or can be integrally produced with the belts either in the form of two small individual cams as well as in the form of a suitable short raised cam track with a rising ramp and a falling ramp. The use of conveyor belts with cam-like raised portions as well as rising ramps and falling ramps offers the special advantage that the items of piece goods are raised and lowered particularly smoothly, a feature which can be of significance, more particularly in the case of piece goods which are especially sensitive to shock.

It is also one advantage of the invention that, independently of the position of the lifting elements, the conveyor chains can remain stretched constantly in the same circumferential shape during the motion of such elements, i.e. the circumference of the conveyor chains is not distorted during the rotating motion.

One exemplified embodiment of the invention will now be described by way of reference to the accompanying drawings.

BRIEF DESCRIPTION OF THE DRAWINGS

In the drawings:

FIG. 1 is a plan view of a transfer device disposed between two roller conveyors which extend parallel with each other, FIG. 2 is a sectional view along the line II—II of FIG. 1 which shows an item of piece goods which has arrived via the transfer unit.

DESCRIPTION OF THE PREFERRED EMBODIMENT

Figure 3:
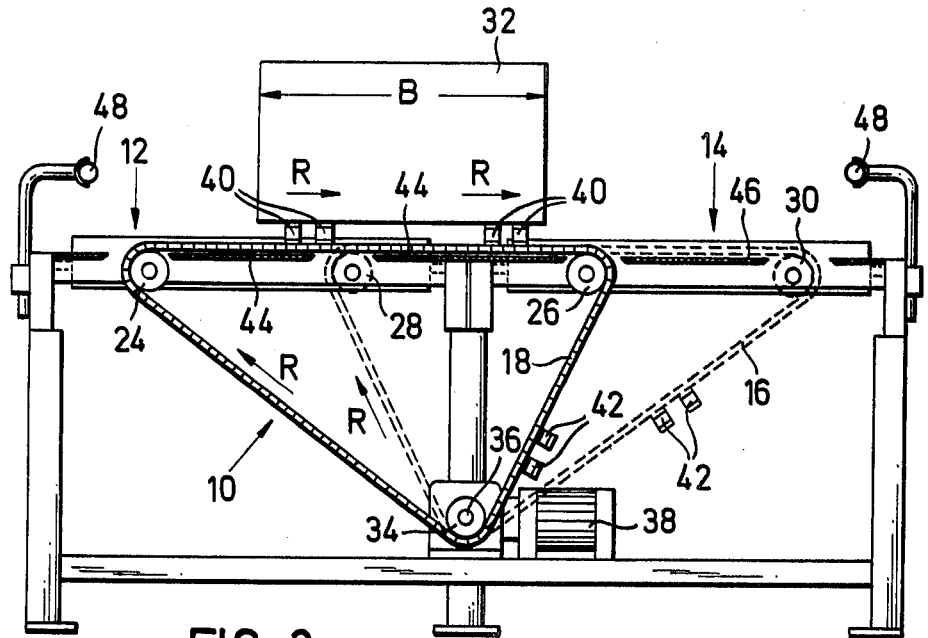
FIG. 3 is a view similar to FIG. 2 in which the transfer unit with the raised item of piece goods is illustrated in a position between the two parallel roller conveyors and FIG. 4 is a view similar to FIG. 2 in which the transfer unit has already deposited the item of piece goods on the parallel roller conveyors.

According to FIG. 1 a transfer unit 10 is situated between two roller track conveyors 12 and 14 which are arranged parallel with and adjacent each other, and have their upper surfaces co-planar, and defining a conveying plane.

The transfer unit 10 comprises two pairs of endless conveyor chains 16, 18, or 20, 22, disposed parallel with each other, around respective endless paths in respective vertical planes parallel with each other. One pair of chains comprises a chain 16 and a chain 18 while the other pair comprises a chain 20 and a chain 22.

The path of each chain includes a straight top run which runs from the roller conveyor 12 to the roller conveyor 14 in the direction of the arrows R and a bottom run which returns beneath the two conveyors. Each conveyor chain is guided over two reversing pulleys situated closely beneath the conveyor plane of the two roller conveyors, of which one is disposed in the region of the roller conveyor 12 and the other in the region of the roller conveyor 14, and each such chain is also guided over a driving pinion.

The top runs of all of the chains are parallel with each other, extending perpendicular to the conveying directions, indicated by arrows r, of the conveyors 12 and 14, the top runs lying in a common plane just below, and parallel with, said conveying plane. Further details of the transfer unit will be described by reference to the conveyor chain pairs 16, 18 because the other conveyor chain pair is constructed in like manner.

Figure 4:
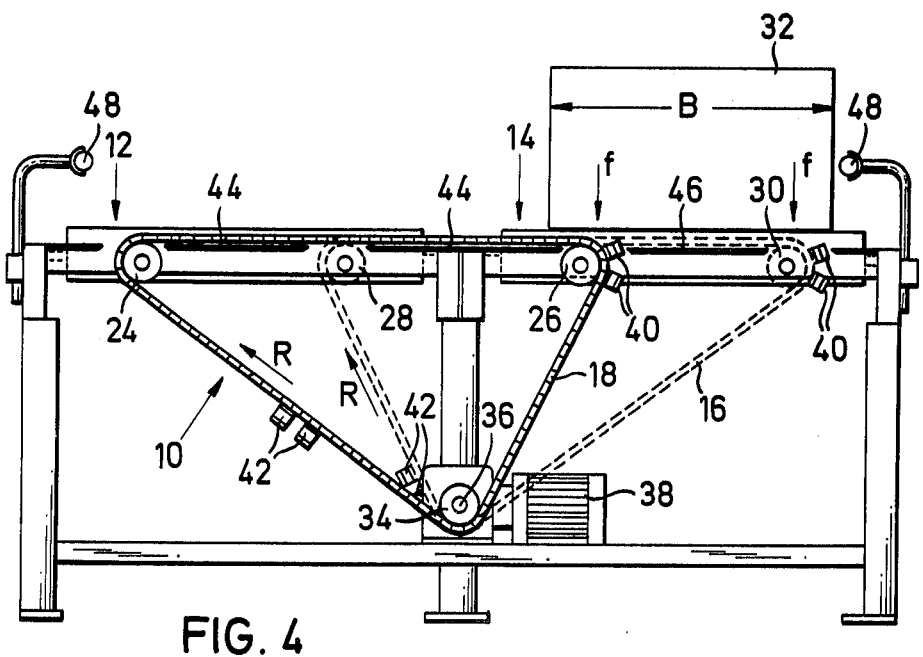

According to FIGS. 2 to 4, the conveyor chain 18 is provided with a reversing member 24, which may be in the form of a sprocket or pulley, or if the chains are roller chains simply as a guide, in the region of the roller conveyor 12 which is distal from the roller conveyor 14 and is provided with a second reversing member 26, which may take the same form as member 24, in the region of the roller conveyor 14 which is closest to the roller conveyor 12. The other conveyor chain 16 of the same pair of conveyor chains on the other hand is provided with a reversing member 28, which may take the same form as members 24 and 26, in the region of the roller conveyor 12 nearest to the roller conveyor 14 and is provided with a second reversing member 30, which may also take the same form as the members 24, 26 and 28, in the region of the roller conveyor 14 which is distal from the roller conveyor 12. For convenience, the members 24, 26, 28 and 30 are referred to hereinafter as "pulleys". The distance between the reversing pulleys 24 and 28 in the region of the roller conveyor 12 on the one hand and the reversing pulleys 26 and 30 in the region of the roller conveyor 14 on the other hand is less than the width B of the items of piece goods 32 which are to be conveyed and transferred.

Also, the lengths of the top runs of all of the chains, corresponding to the distance between pulleys 24 and 26 in the case of chain 18, and between the pulleys 28 and 30 in the case of chain 16, are all the same.

Furthermore, the conveyor chains are guided over driving pinions or sprockets 34 all of which are fixed on a common driving shaft 36 and are driven by a motor 38. The spacing between the pair of conveyor chains 16 and 18 and the pair of conveyor chains 20 and 22 is less than the length, measured in the direction of motion of the roller conveyors 12 and 14, of the items of piece goods 32 to be conveyed.

At least one set of lifting elements 40 is provided the lifting elements of the set being fixedly mounted on the four conveyor chains at the same circumferential place of each conveyor chain i.e. so that all the lifting elements 40 of the set are simultaneously guided around the respective reversing pulleys in the course of the chain motion and therefore simultaneously enter the conveyor plane or are simultaneously guided out of said plane, it being understood that the sprockets 34 engage the chains positively to drive the chains at identical linear speeds and without relative longitudinal motion, i.e. slippage, with respect to each other. Preferably the set of lifting elements includes a respective pair of elements 40 secured at the same place to each of the chains. In FIGS. 2 to 4 the elements 40 are shown slightly staggered for purposes of illustration.

A second set of lifting elements 42 can be provided comprising a respective further pair of elements 42 supported by each conveyor chain, each said further pair being situated at a distance from the pair of lifting elements 40 on the same chain, said distance being such that, in the course of movement of the conveyor chains, only one pair, either the pair of lifting elements 40 or the pair of lifting elements 42, projects above the conveying plane at any one time.

Each conveyor chain is guided over a slide rail 44 or 46 disposed parallel with the conveyor plane.

The transfer unit is in the pass-through position if the pairs of lifting elements are disposed completely beneath the conveyor plane. The transfer unit moves into the transfer position at the moment at which one of the two pairs of lifting cams 40 or 42 of all conveyor chains is moved about the associated reversing pulleys 24 or 28 into the conveyor plane and rises above said plane. In FIG. 2 the transfer unit is still in the pass-through position and in FIG. 4 it is again in the pass-through position while in FIG. 3 it is in the transfer position. If the transfer unit is not set in motion in the view illustrated in FIGS. 2 and 3 the item of piece goods 32 passes through on the roller conveyor 12 or on the roller conveyor 14 without being influenced by the transfer unit.

A transfer operation will now be described by reference to the drawing.

According to FIG. 1 an item of piece goods 32 moves on the roller conveyor 12 in the direction of the arrow r towards the transfer unit while another item of piece goods 32 already moves on the roller conveyor 14 away from the transfer unit, also in the direction of the arrow r. According to FIG. 2 the item of piece goods 32 has arrived on the roller conveyor 12 via the transfer unit. If the conveyor chains 16 and 18 are then set in motion the pair of lifting cams 40 of the conveyor chain 16 simultaneously with a pair of lifting cams 40 on the conveyor chain 18 will act beneath the item of piece goods 32 which is raised slightly above the conveyor plane and is entrained by the conveyor chains in the direction of the arrow R towards the other roller conveyor 14 in accordance with the view illustrated in FIG. 3. According to FIG. 4 the item of piece goods 32 has arrived via the parallel second roller conveyor 14 and both pairs of lifting cams have moved away beneath the item of piece goods 32 while this is lowered in the direction of the arrows f on the rollers of the roller conveyor 14. A stop abutment 48 ensures that the items of piece goods 32 are retained completely above the rollers of the roller conveyors during the transfer motion.

A second pair of lifting cams 42 in conjunction with a first pair of lifting cams 40 enables items of piece goods which arrive without interruption on the roller conveyor to be transferred without interruption.

The direction of rotation of the transfer unit can be readily reversed in order to transfer items of piece goods from the roller conveyor 14 to the roller conveyor 12.

If the items of piece goods are to pass through on the roller conveyors in the region of the transfer unit the latter is stopped in a position in which the pairs of lifting cams 40 and 42 are disposed completely beneath the conveyor plane. Such stopping can be achieved in a simple manner, for example by means of limit switches.

The conveyor chains described and illustrated by reference to the exemplified embodiment can of course also be replaced by conveyor belts. It is then possible to attach the lifting cams fixedly on such belts or to produce them integrally with the conveyor belt in the form of a suitable short cam track with a rising ramp and a falling ramp.

Particularly smooth raising and lowering of the items of piece goods is possible if the lifting cams are provided with a rising ramp and a falling ramp.

I claim:

1. A transfer conveyor suitable for the optional transfer of piece goods from a first roller track conveyor to a second, adjoining, parallel and co-planar roller track conveyor, said transfer conveyor comprising at least three endless flexible filamentary conveyor elements, reversible guiding means for guiding said conveying elements around respective paths, each said path including an upper conveying run and a lower return turn, said upper runs being straight, being disposed below but closely adjacent a predetermined plane and being of the same length, said conveying runs extending substantially parallel with each other and wherein two of the transfer conveying runs extend between like lateral sides of the two roller track conveyors and the third transfer conveying run extends between the remaining like lateral sides of said roller track conveyors, the transfer conveyor including lifting elements secured to said conveying elements, each said conveying element having at least one said lifting element secured thereto, each said lifting element when disposed on the lower return run of the associated conveyor element being situated entirely below said conveying plane and when disposed on the conveying run of the associated conveyor element projecting above said conveying plane, the transfer conveyor further including driving means in positive engagement with said conveying elements whereby said conveying elements can be driven at the same linear speed, such that during driving of said elements by said driving means, the respective lifting elements rise above the conveying plane simultaneously.

2. A transfer conveyor suitable for the optional transfer of piece goods from a first roller track conveyor to a second, adjoining, parallel and co-planar roller track conveyor, said transfer conveyor comprising a first and a second pair of endless conveyor chains, guiding means for guiding each said conveyor chain including, for each said chain, a first and a second reversing pulley, means mounting said reversing pulleys rotatably at positions below a predetermined conveying plane, each said conveyor chain having an upper, conveying run extending between the tops of the respective first and second reversing pulleys below, but adjacent said conveying plane and a lower, return, run extending below the respective conveying run, each said chain having a lifting element thereon which, when disposed on the respective return run lies below said conveying plane and which, when disposed on the respective conveying run lies above the conveying plane, said chains having their conveying runs parallel with each other and said chains being spaced apart transversely of the longitudinal direction of their conveying runs, said reversing pulleys associated with one conveyor chain of one pair being spaced from the reversing pulleys of the other conveyor chain of the same pair wherein one chain of each pair of the transfer conveying run extends between like lateral sides of the two roller track conveyors and the second chain of each pair extends between the remaining like lateral sides of said roller track conveyors and the lifting elements being disposed at the same circumferential place of both conveyor chains of one pair, the transfer conveyor including driving means in driving engagement with each chain whereby the transfer conveyor can be placed in a pass-through position in which all of said lifting elements are situated below said conveying plane and a transfer position in which said lifting elements project simultaneously above said conveying plane.

3. The transfer conveyor of claim 2, in which each of the conveyor chains supports at least two closely adjacently disposed lifting elements at the same circumferential place.

4. The transfer conveyor of claim 3, in which each conveyor chain supports at least one second group of lifting elements situated at a distance from the first group of lifting elements which said distance is greater than the distance between the distal circumferential parts of the two reversing pulleys disposed in the region of the conveying plane and associated with the same conveyor chain.

5. The transfer conveyor of claim 2, in which said driving means includes a driving pinion for each said conveyor chain and in which the driving pinions of the conveyor chains of at least one pair are disposed on the same driving axis.

6. The transfer conveyor of claim 2, in which the conveyor chains are guided on guide rails which are disposed parallel with the conveyor plane.

7. The combination of the transfer conveyor of claim 2 with a first roller track conveyor and a second, adjoining, parallel and co-planar roller track conveyor, the upper surfaces of the rollers of the two tracks defining said conveying plane, said lifting elements, in said transfer position passing through gaps between adjoining rollers of the roller track conveyors and said conveying runs extending at right angles to the conveying directions of the roller track conveyors.

* * * * *